United States Patent [19]  
Danbury

[11] Patent Number: 5,278,481  
[45] Date of Patent: Jan. 11, 1994

[54] CONTROL OF STEPPING MOTORS

[75] Inventor: Richard N. Danbury, Easton, England

[73] Assignee: British Technological Group Ltd., London

[21] Appl. No.: 920,501

[22] PCT Filed: Feb. 22, 1991

[86] PCT No.: PCT/GB91/00285  
§ 371 Date: Aug. 21, 1992  
§ 102(e) Date: Aug. 21, 1992

[87] PCT Pub. No.: WO91/13490  
PCT Pub. Date: Sep. 5, 1991

[30] Foreign Application Priority Data  
Feb. 22, 1990 [GB] United Kingdom ............... 9004005

[51] Int. Cl.⁵ ............................................. G05B 19/40  
[52] U.S. Cl. ................................... 318/685; 318/696  
[58] Field of Search ............................. 318/685, 696

[56] References Cited

U.S. PATENT DOCUMENTS

| | | | |
|---|---|---|---|
| 4,717,864 | 3/1988 | Fultz | 318/254 |
| 4,963,808 | 10/1990 | Torisawa et al. | 318/685 |
| 5,075,609 | 12/1991 | Ito et al. | 318/696 |
| 5,111,242 | 5/1992 | Tanimoto et al. | 318/685 |
| 5,117,171 | 5/1992 | Bonss | 318/696 |
| 5,164,650 | 11/1992 | Kikugawa | 318/696 |

FOREIGN PATENT DOCUMENTS

| | | |
|---|---|---|
| 0127346 | 2/1984 | European Pat. Off. . |
| 3005139 | 8/1981 | Fed. Rep. of Germany . |
| 3406977 | 9/1985 | Fed. Rep. of Germany . |
| 1496344 | 12/1977 | United Kingdom . |
| 2071941 | 9/1981 | United Kingdom . |

OTHER PUBLICATIONS

Patent Abstracts of Japan, vol. 11, No. 20, Jan. 20, 1987, & JP-A-61 191285 (Minolta Camera) Aug. 25, 1986.  
Transactions of the Institute of Measurement and Control, vol. 6, No. 6, Dec. 1984, Dorking GB, pp. 282-286; Acarnley: "Minimising point-to-point positioning times using closed-loop stepping-motor control".  
PCT International Search Report (2).  
Elektrotechnik, vol. 70, No. 16, Sep. 30, 1988, Wurzburg De, pp. 26-31, Gfrodner: "Dynamisches Bindeglied" w/translation.

Primary Examiner—William Shoop, Jr.  
Assistant Examiner—Karen Masih  
Attorney, Agent, or Firm—Nixon & Vanderhye

[57] ABSTRACT

A control circuit for a stepping motor (20) comprises a transistorised drive circuit (122) having a plurality of switching positions in each of which the drive circuit (122) is arranged to supply current to selected windings of the stepping motor in selected directions. A sequencer (130) is arranged to apply control signals to the drive circuit (122) to change the switching positions in sequence. An encoder (128) provides a train of pulses representative of the speed and position of the motor (120). An excitation controller (134) is arranged to receive the encoder pulses and to generate in response thereto change excitation signals for causing change of the switching positions, and change direction signals for determining the direction in which the sequence of switching positions is changed. The provision of both change excitation signals and direction signals offers maximum flexibility, because it enables, for example, speedy reversal of the torque of the stepping motor (120) by causing the sequencer (130) to step backwardly through the switching sequence. The change excitation signals are generated by said excitation controller (134) in a manner which enables the switching angle of the stepping motor to be varied substantially without limit so that complete control of the stepping motor is available.

15 Claims, 14 Drawing Sheets

⊗ current into page
⊙ current out of page

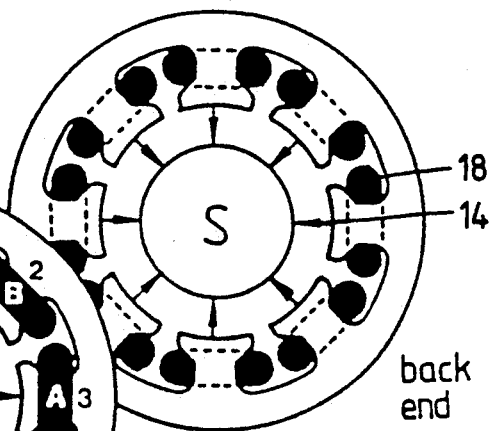
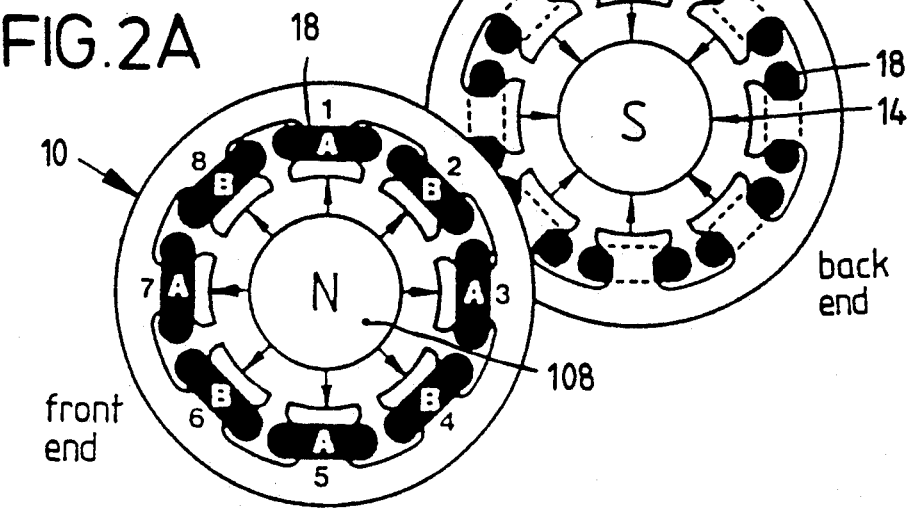
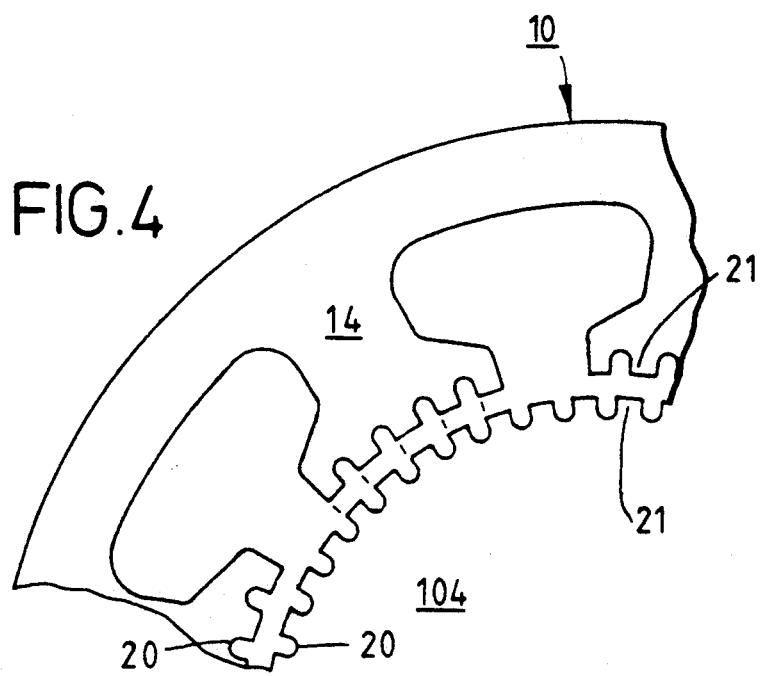

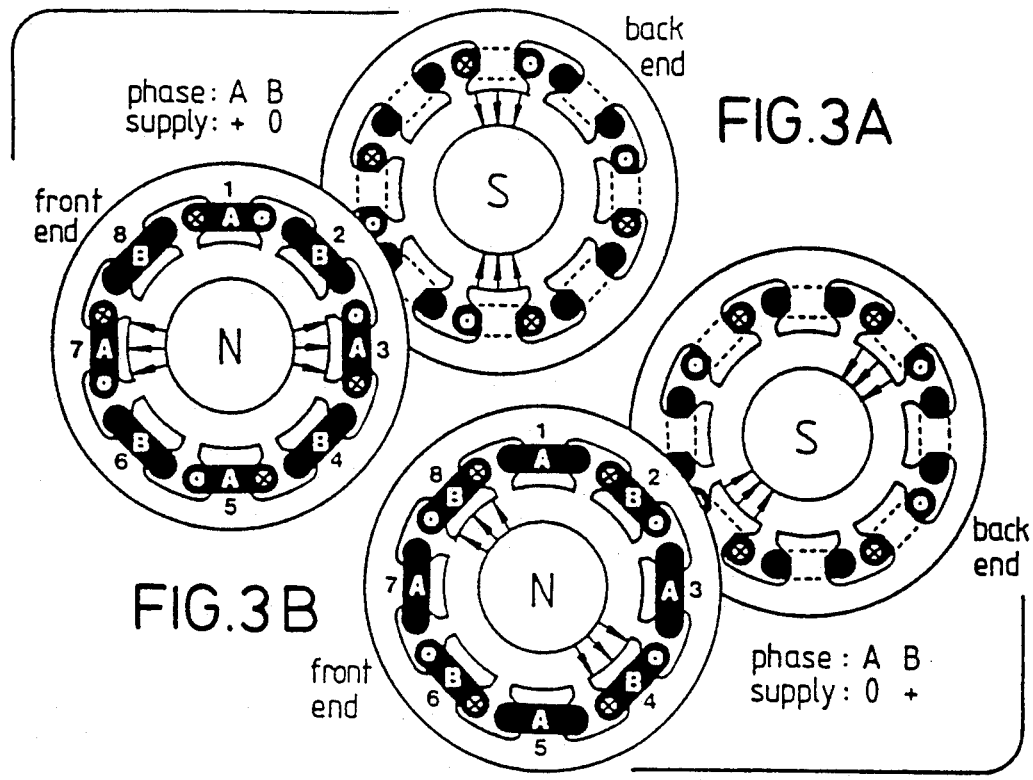
FIG.3A
FIG.3B
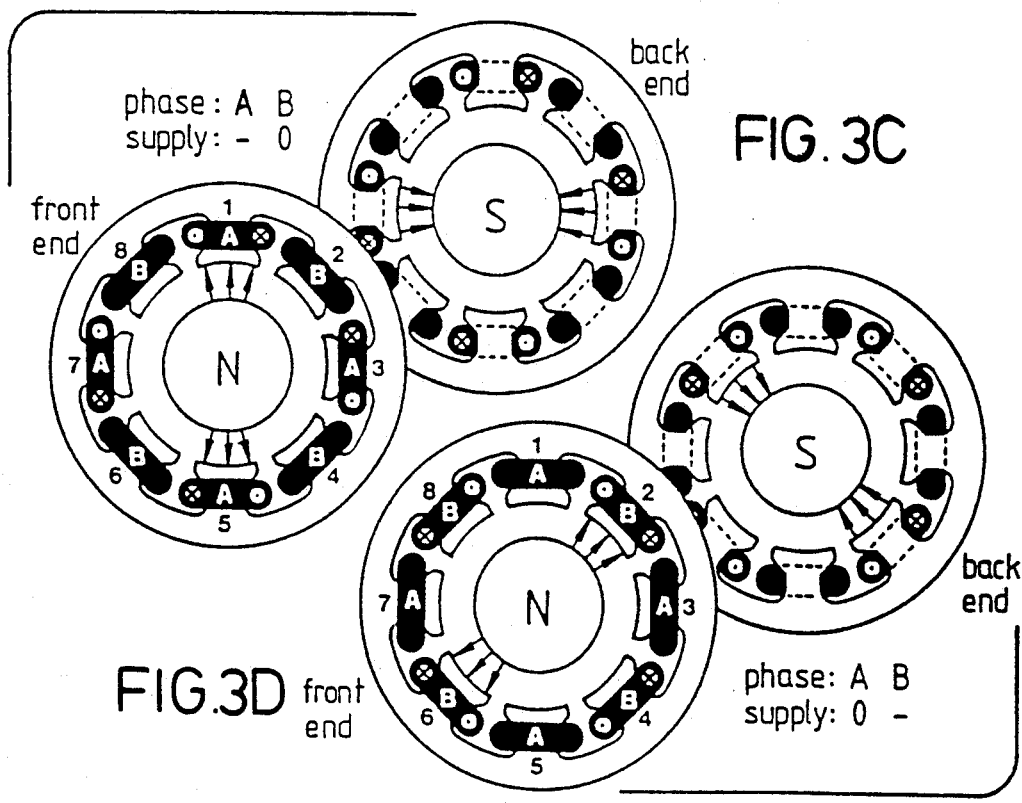
FIG.3C
FIG.3D

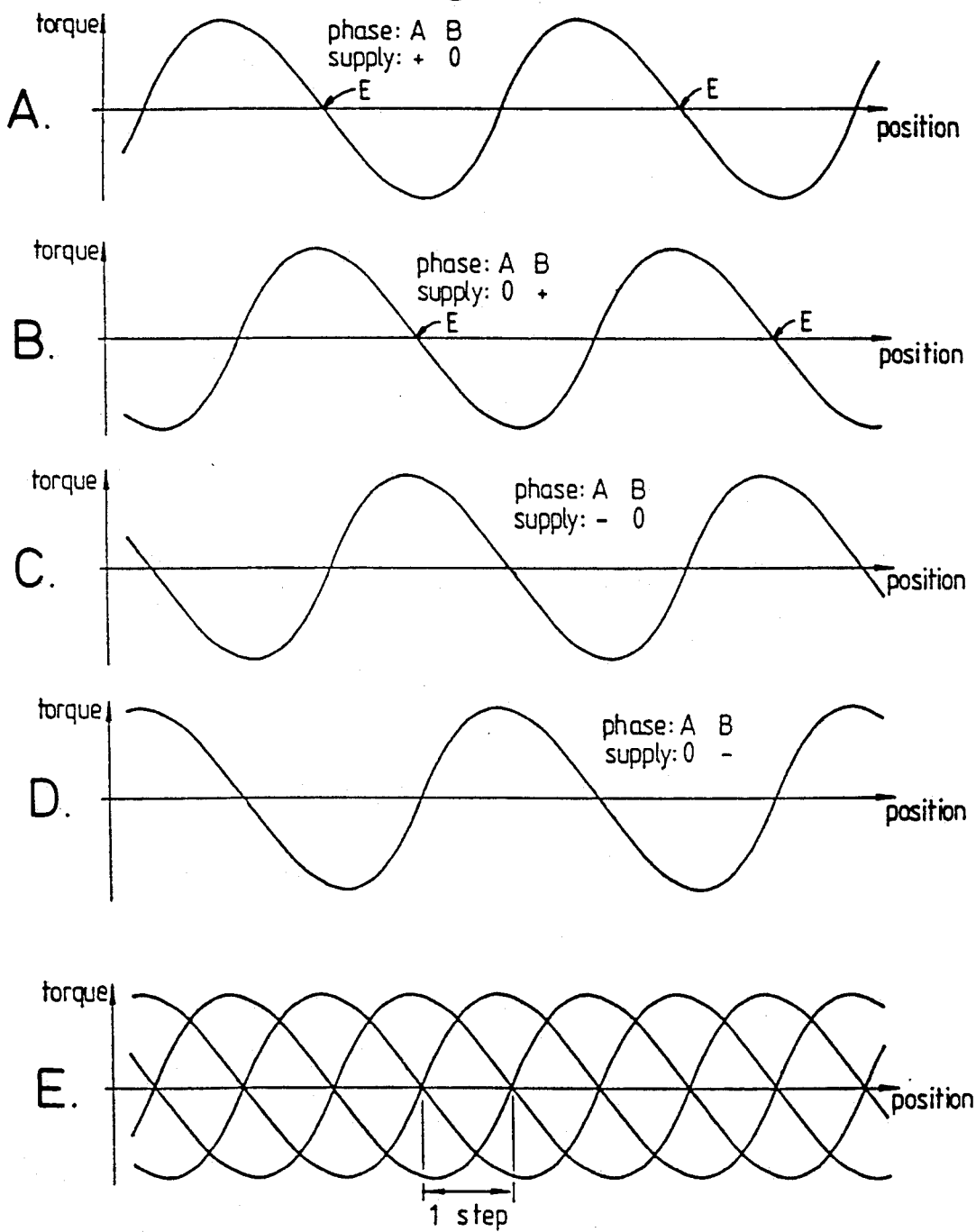

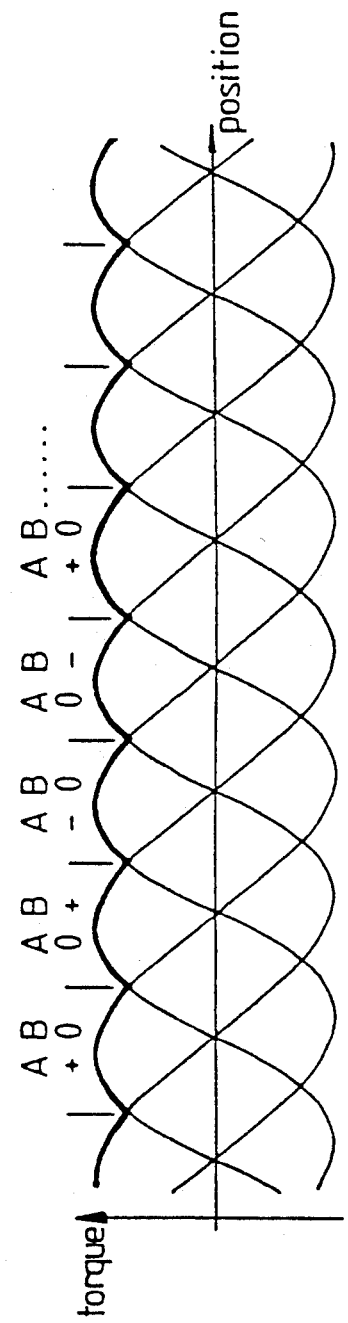

| transistor switching sequence | | | |
|---|---|---|---|
| A1,A2 | B1,B2 | C1,C2 | D1,D2 |
| ON | off | ON | off |
| off | ON | ON | off |
| off | ON | off | ON |
| ON | off | off | ON | position

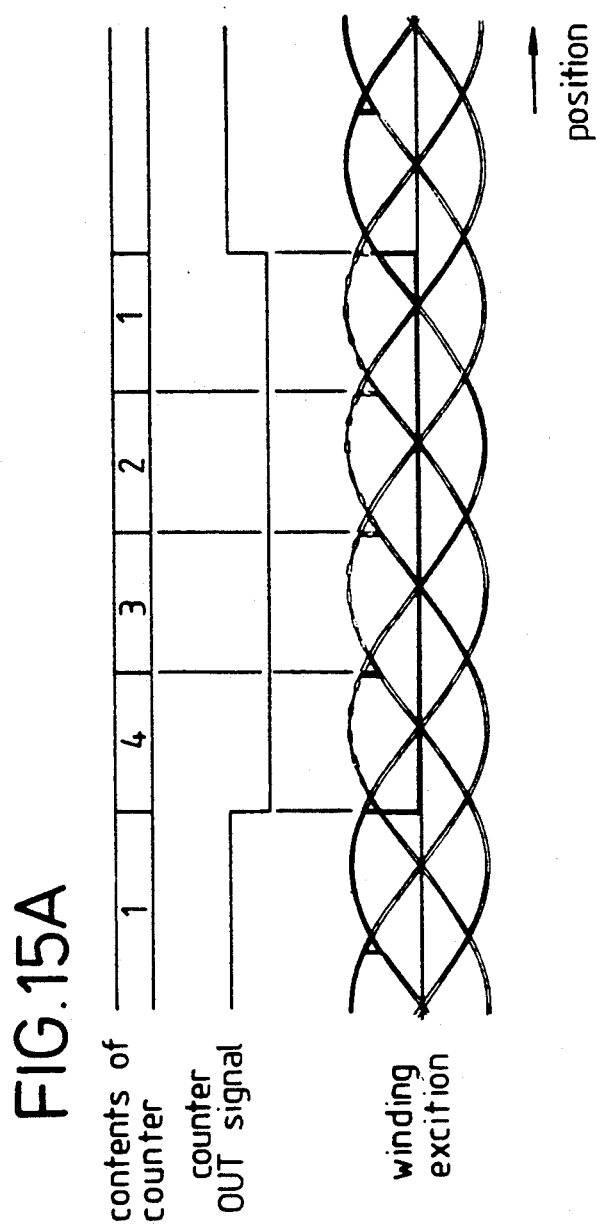

CONTROL OF STEPPING MOTORS

The present invention relates to the control of stepping motors, and in particular provides a control circuit for a stepping motor, and a stepping motor controller.

It is known that to obtain optimum torque from a stepping motor over a range of speeds, its switching angle has to be varied. However, many earlier control schemes have enabled variation of the switching angle over one step only.

The present invention seeks to provide a control circuit and a controller for a stepping motor which is more convenient than those available previously, and which enables the switching angle of a stepping motor to be varied substantially without limit so that complete control of the stepping motor is available.

According to a first aspect of the present invention there is provided a control circuit for a stepping motor comprising drive means having a plurality of switching positions in each of which the drive means is arranged to supply current to selected windings of a stepping motor in selected directions, and means arranged to change the switching positions in sequence, said control circuit further comprising sensor means for providing information relating to the speed and position of the motor, and control means arranged to receive the speed and position information and to generate in response thereto change excitation signals for application to said drive means to change the switching positions, the control means also being arranged to produce direction signals for application to said control means to determine the direction in which the sequence of switching positions is changed.

The invention also extends to a control circuit for a stepping motor comprising drive means having a plurality of switching positions in each of which the drive means is arranged to supply current to selected windings of a stepping motor in selected directions, and means arranged to change the switching positions in sequence, said control circuit further comprising sensor means for providing information relating to the speed and position of the motor, and control means arranged to receive the speed and position information and to generate in response thereto control signals for said drive means, wherein said control means further comprises inhibiting means arranged selectively to inhibit the application of control signals to said drive means.

According to a further aspect of the invention there is provided a control circuit for a stepping motor comprising drive means having a plurality of switching positions in each of which the drive means is arranged to supply current to selected windings of a stepping motor in selected directions, and means arranged to change the switching positions in sequence, said control circuit further comprising sensor means for providing information relating to the speed and position of the motor, and control means arranged to receive the speed and position information and to generate in response thereto control signals for said drive means, wherein said control means further comprises step complete signal generating means arranged to generate a step complete signal upon receipt of information from said sensor means indicating the motor has moved a predetermined number of steps, and synchronising means receiving said step complete signals and arranged to enable generation of said control signals upon receipt of a step complete signal.

Preferably, the control signals generated by said control means comprise change excitation signals for application to said drive means to change the switching positions, and direction signals for application to said drive means to determine the direction in which the sequence of switching positions is changed.

The provision of both change excitation signals and direction signals offers maximum flexibility, because it enables, for example, speedy reversal of the torque of a stepping motor by causing the drive means to step backwardly through the switching sequence.

In an embodiment, said sensor means is arranged to be coupled to the motor and is arranged to generate a train of pulses representative of the speed and position of the motor.

Preferably, said control means comprises first means, for example, a first counter, arranged to receive said train of pulses from said sensor means and to generate a step complete signal each time a predetermined number of said pulses are received.

In an embodiment, said control means comprises second means, for example, a second counter, arranged to receive said train of pulses from said sensor means and to generate a change excitation signal each time a selected number of said pulses is received, wherein said selected number is variable. By changing the number of pulses which have to be received from the sensor means before a change excitation signal is generated, the switching angle of the stepping motor is varied.

Preferably, said control means further comprises a synchronisation circuit arranged to receive step complete signals, said synchronisation circuit being coupled to apply command signals to said second counter circuit whereby the operation of said second counter circuit is synchronised in dependence upon said step complete signals.

In an embodiment, said second counter circuit comprises a counter coupled to first and second registers, and to a control logic circuit. Each of the first and second registers is arranged to be loaded with a preselected number, and said control logic circuit is arranged to selectively transfer the contents of one of said first and second registers to the counter when its count is zero. The counter is arranged to decrement upon the arrival of each pulse from said sensor means.

In an embodiment the control logic circuit of said second counter circuit is arranged generally to cause the counter to reload from the first register, but causes the counter to reload from the second register upon receipt of a command signal from said synchronisation circuit.

Preferably, logic means are provided for applying change excitation signals to said drive means. Said change excitation signals may be fed to said drive means by way of logic means, for example, an OR gate, having a first input to which the change excitation signals are fed, and a second input arranged to receive start signals. Upon starting, the counter of said second counter circuit is loaded with a further preselected number whereby the switching angle at which running of the motor will commence is determined.

Said control means preferably comprises a third means, for example, a third counter circuit, arranged to inhibit the application of control signals to said drive means upon the receipt of command signals. Preferably, the control signals generated by said control means comprise change excitation signals for application to said drive means to change the switching positions, and direction signals for application to said drive means to determine the direction in which the sequence of switching positions is changed, and wherein said third means is arranged to inhibit the application of at least said change excitation signals to said drive means.

In an embodiment, said control means further comprises step complete signal generating means arranged to generate a step complete signal upon receipt of information from said sensor means indicating the motor has moved a predetermined number of steps, and synchronising means receiving said step complete signals and arranged to enable generation of said control signals upon receipt of a step complete signal, and wherein said synchronising means is arranged to generate said command signals, whereby said command signals are synchronised with said step complete signals.

In an embodiment, logic means are arranged to pass the change excitation signals to said drive means, and said third means is arranged to inhibit passage of the change excitation signals through said logic means gates upon receipt of a command signal. The logic means may be an array of logic gates, for example, AND gates, and the output of the third counter circuit is preferably connected to one input of each of the gates in said array.

The control means preferably comprises synchronising means, for example, comprising at least one synchronisation circuit arranged to generate control signals synchronised with the step complete signals. In an embodiment, said synchronisation circuit has a plurality of bistable circuits, a clock input of one of said bistable circuits being arranged to receive step complete signals.

In an embodiment, said synchronisation circuit comprises a first flip-flop having an output terminal connected to an input of a second flip-flop, an output of the second flip-flop being arranged to provide a command signal. A request signal may be applied to the clock input of the first flip-flop and step complete signals are fed to the clock input of the second flip-flop. Preferably, a reset flip-flop is arranged to receive at its input the command signal generated at the output of said second flip-flop. Change excitation signals may be applied to the clock input of said reset flip-flop whereby the first and second flip-flops are arranged to be reset in synchronism with the change excitation signals.

In an embodiment, said drive means comprises a drive circuit arranged to apply current to selected windings of the stepping motor in selected directions, and sequencing means arranged to control the drive circuit to select the windings to which current is to be supplied and the current direction.

In an embodiment, the drive circuit comprises a plurality of switching devices, for example, transistors, and the sequencing means is arranged to switch the switching devices on and off in sequence.

The present invention also extends to a controller for a stepping motor, the controller comprising at least one control circuit arranged to produce change excitation signals, and at least one synchronisation circuit arranged selectively to produce direction signals, and further comprising a sequencing circuit connected to receive said change excitation signals and said direction signals to produce control signals for a stepping motor drive circuit.

In an embodiment, said control circuit comprises first means arranged, upon receiving a predetermined number of pulses, to generate a step complete signal.

Preferably, said control circuit comprises second means arranged, upon receiving a selected number of pulses, to generate a change excitation signal. The control circuit also preferably comprises means to vary said selected number.

Preferably, said control circuit comprises third means arranged selectively to inhibit the production of control signals.

In an embodiment, each of said first, second, and third means comprises a respective counter circuit, an output of said first counter circuit being coupled to each of said second and third means. An output of said second counter circuit being connected to said sequencing circuit.

Preferably, each of said first, second and third counter circuits are substantially the same, each comprising a respective counter connected to an input byway of respective control logic, and each having at least one register coupled to the counter.

In an embodiment, each of said second and third counter circuits is coupled to synchronising means. For example, a respective synchronisation circuit is coupled to a control input of the control logic of the respective counter circuit. Preferably, said output of said first counter circuit is coupled to each said synchronisation circuit.

Preferably, the or each said synchronisation circuit comprises a first flip-flop having an output terminal connected to an input of a second flip-flop, an output of the second flip-flop being arranged to provide a command signal.

In an embodiment, the or each said synchronisation circuit further comprises a reset flip-flop arranged to receive at its input the command signal generated at the output of said second flip-flop.

The invention also extends to a method of controlling a stepping motor utilising drive means having a plurality of switching positions in each of which the drive means is arranged to supply current to selected windings of the stepping motor in selected directions, and means arranged to change the switching positions in sequence, said method comprising the steps of generating information relating to the speed and position of the motor, generating in response to the speed and position information change excitation signals, applying the change excitation signals to said drive means to change the switching positions, and generating direction signals, and applying said direction signals to said drive means to determine the direction in which the sequence of switching positions is changed.

Embodiments of the present invention will hereinafter be described, by way of example, with reference to the accompanying drawings, in which.

Figure 1:
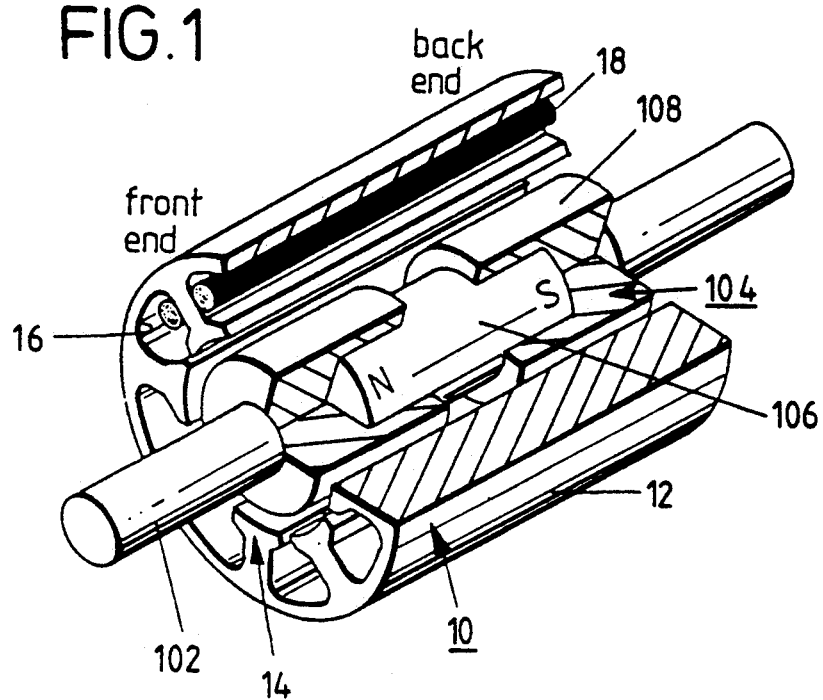
FIG. 1 shows a cut-away perspective view of a hybrid stepping motor.
Figures 7, 7A:
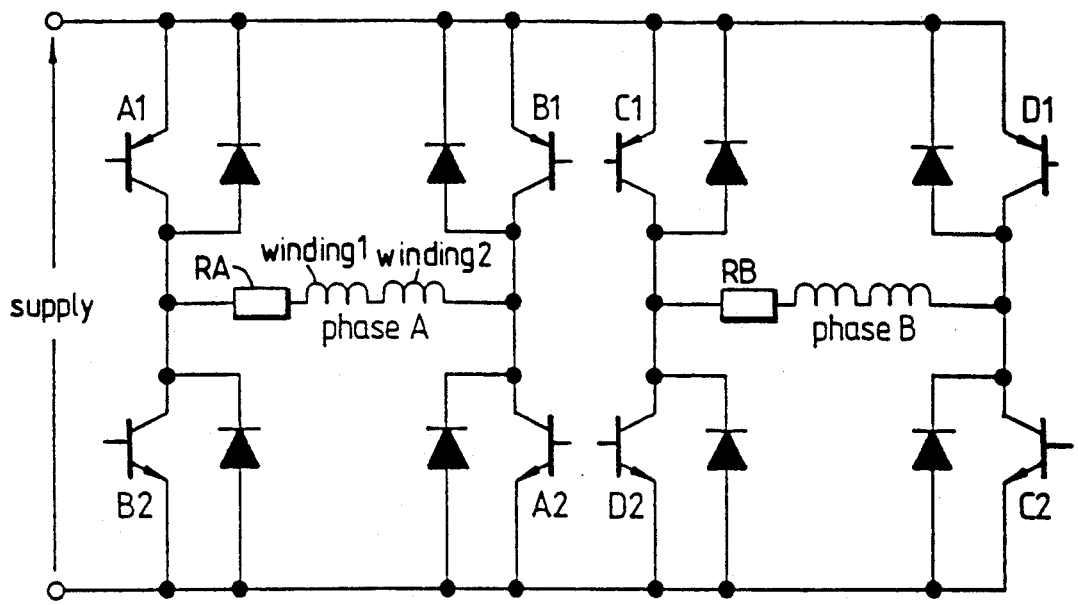
Figure 8:
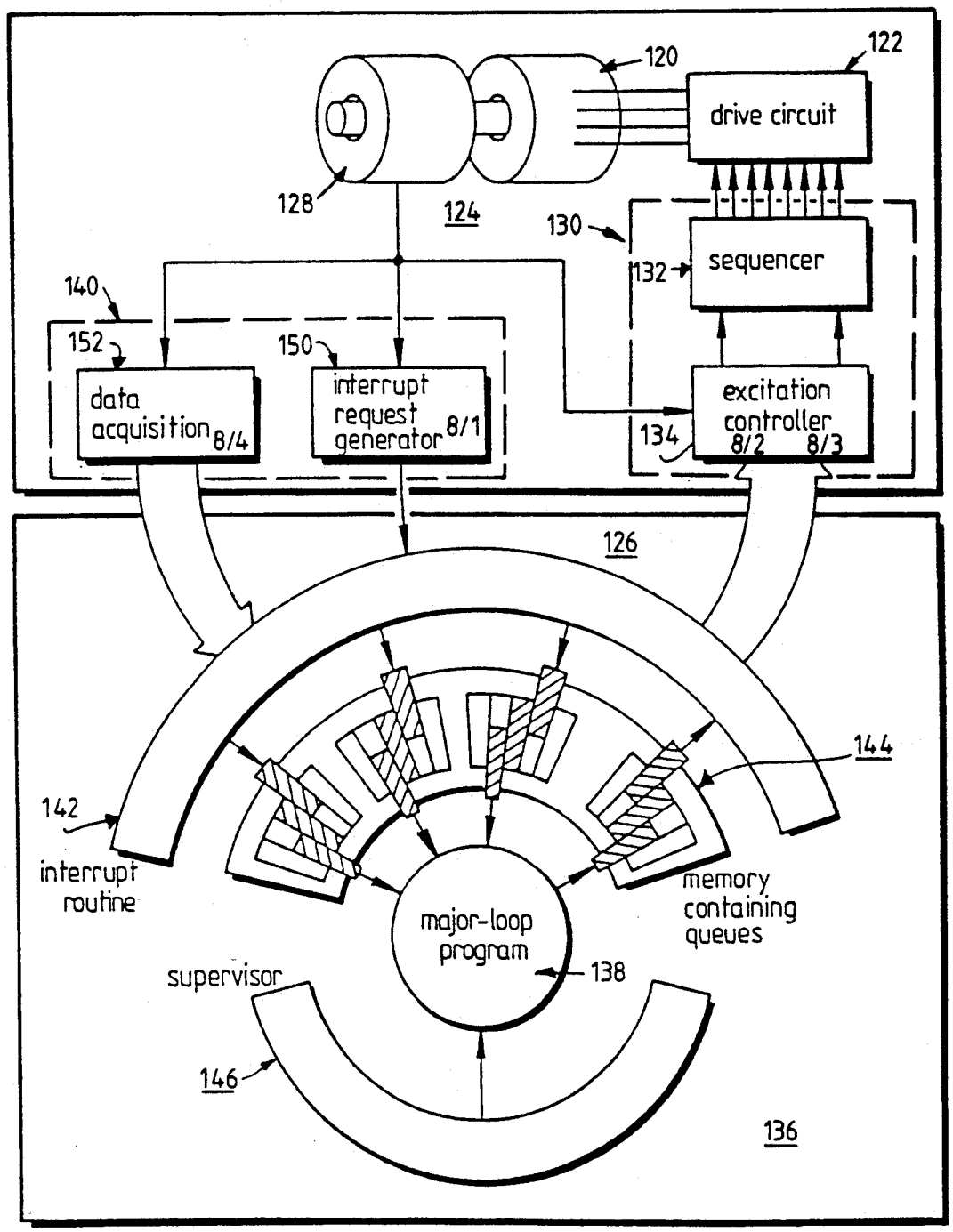
Figure 9:
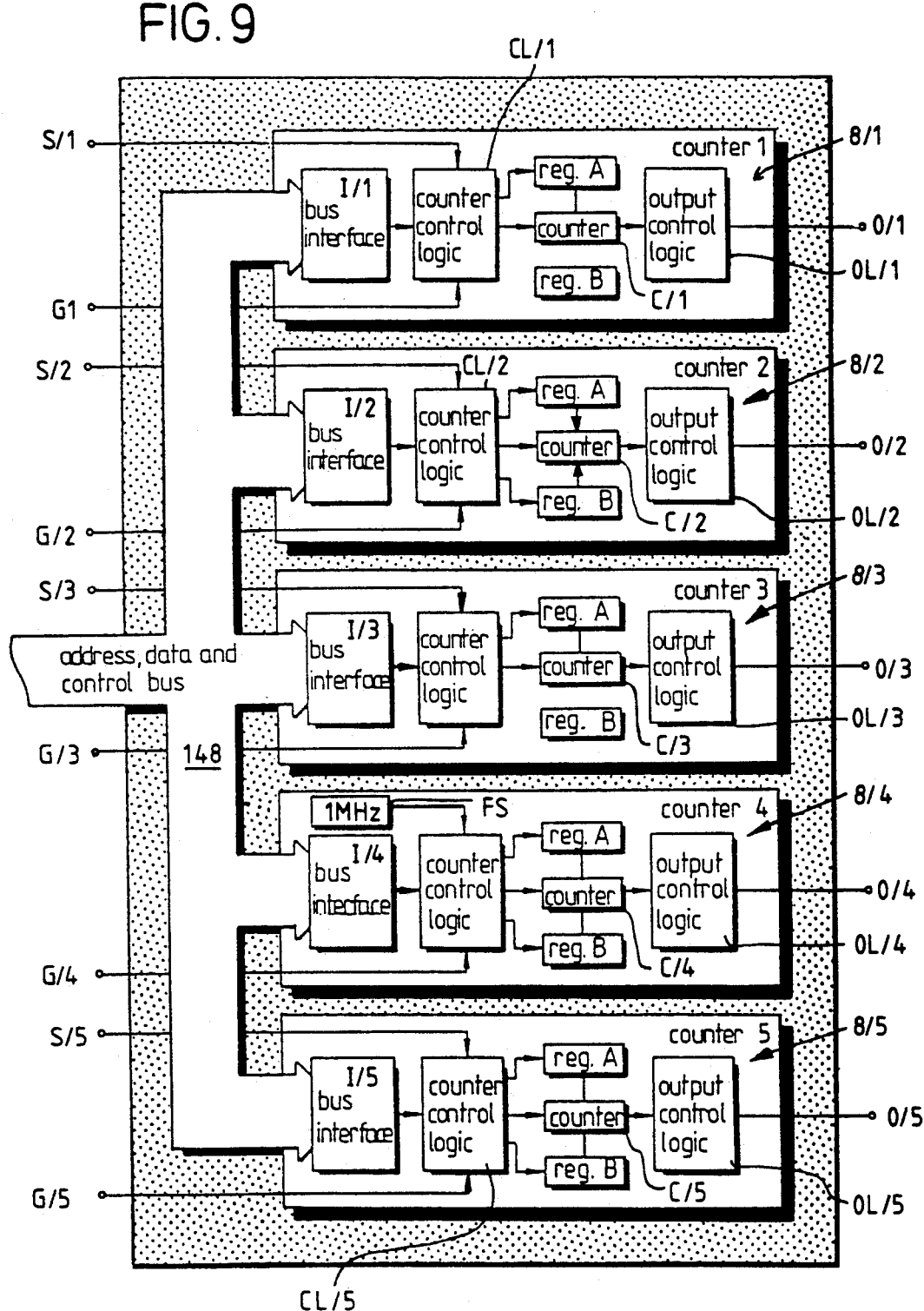
Figure 10:
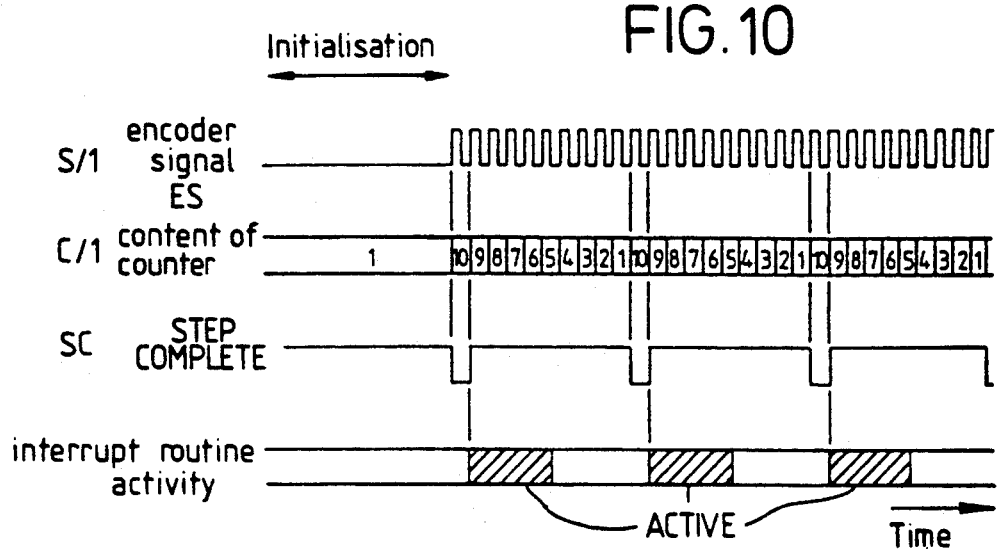
Figure 11:
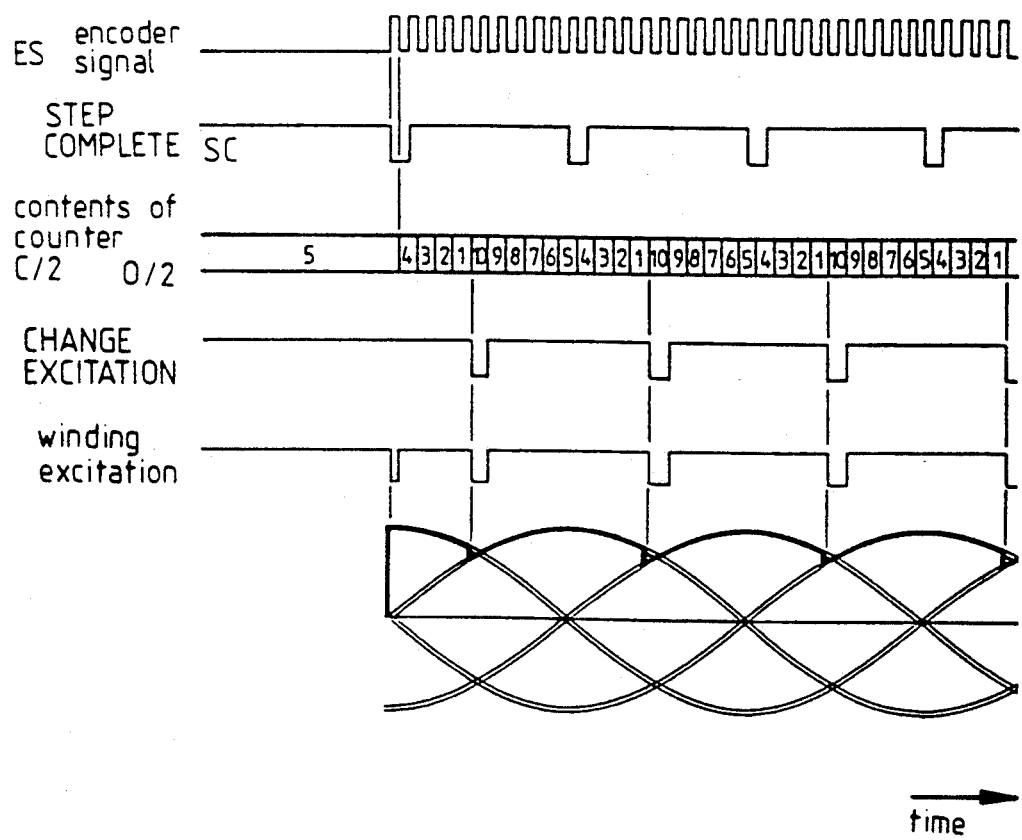
Figure 12:
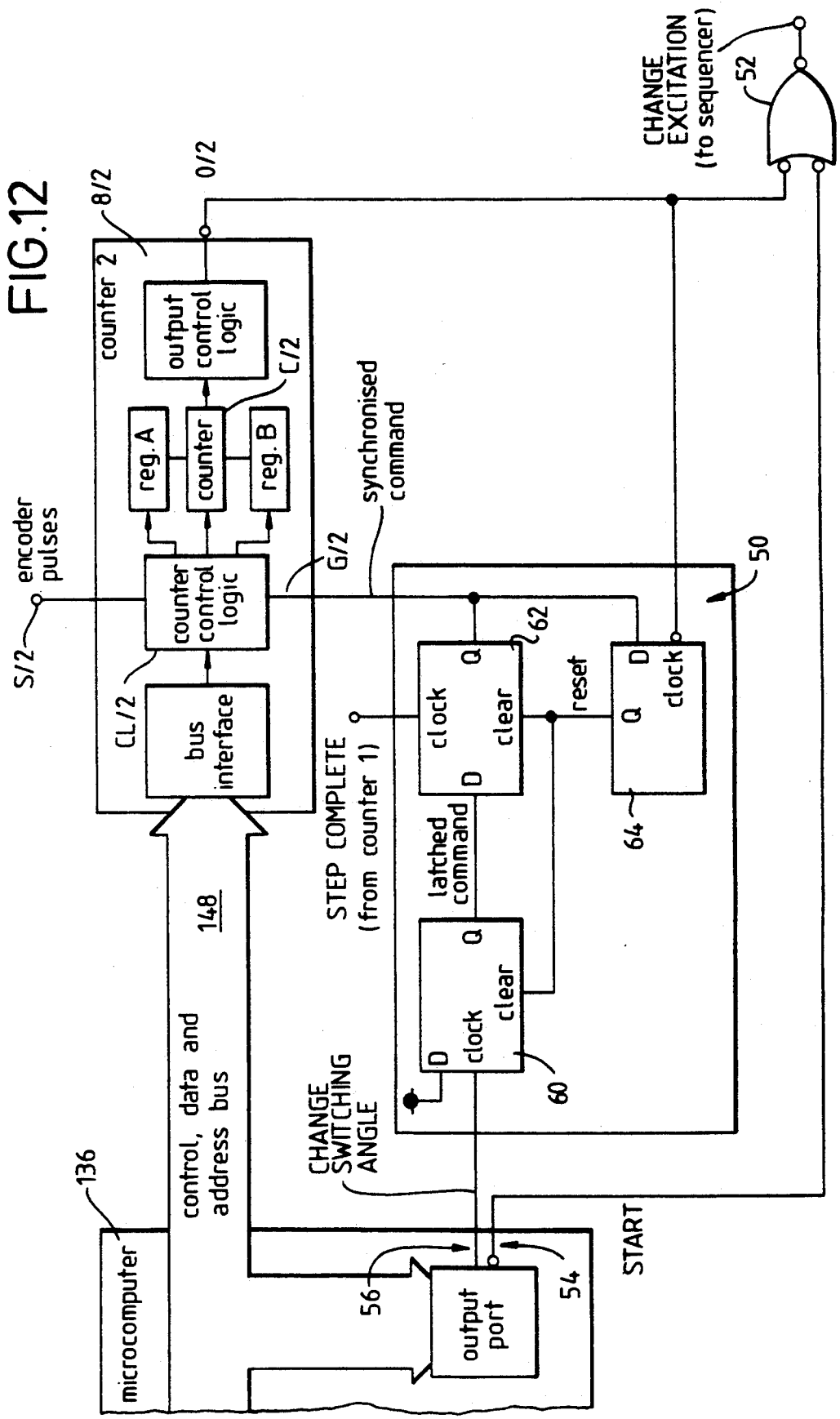
Figure 13:
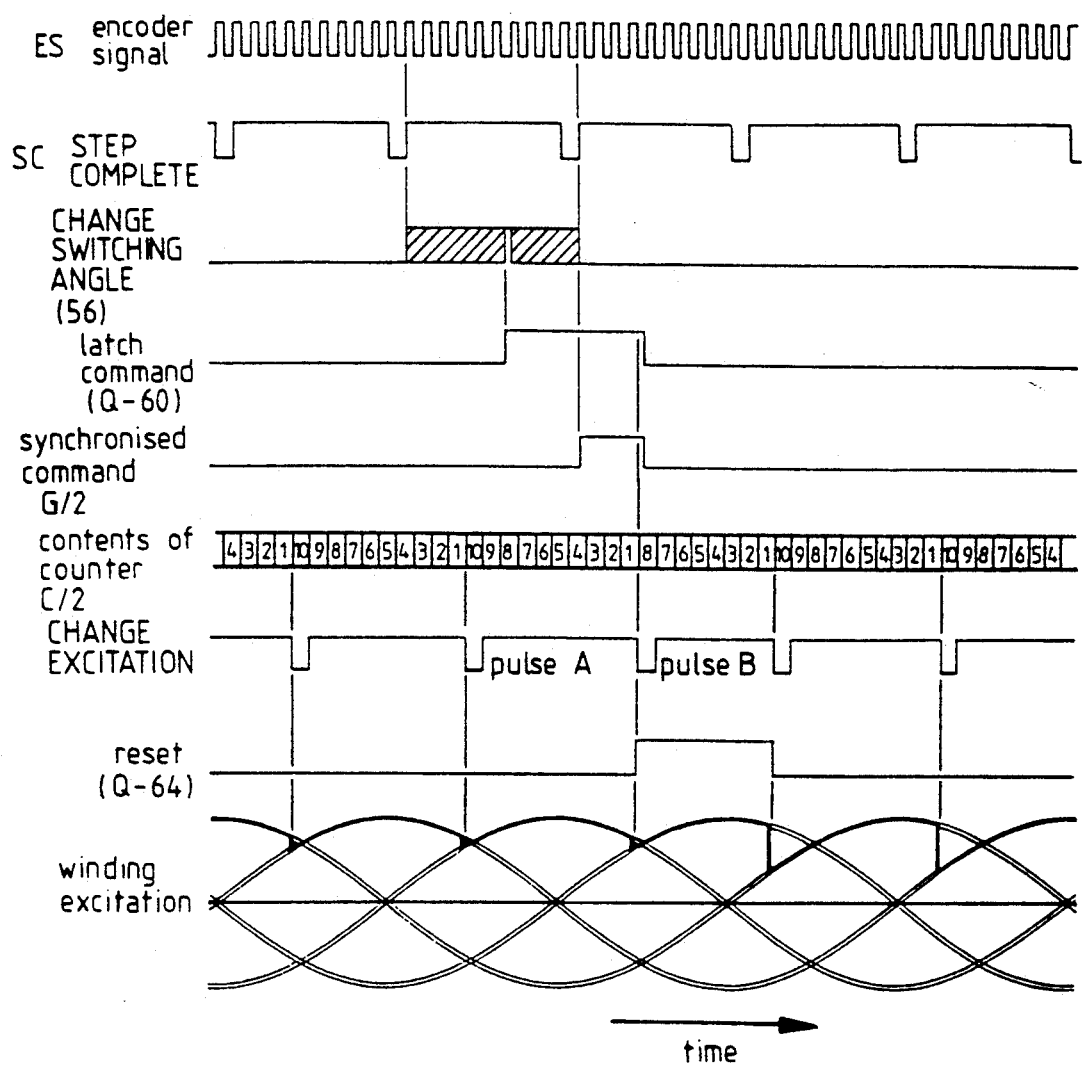
Figure 14:
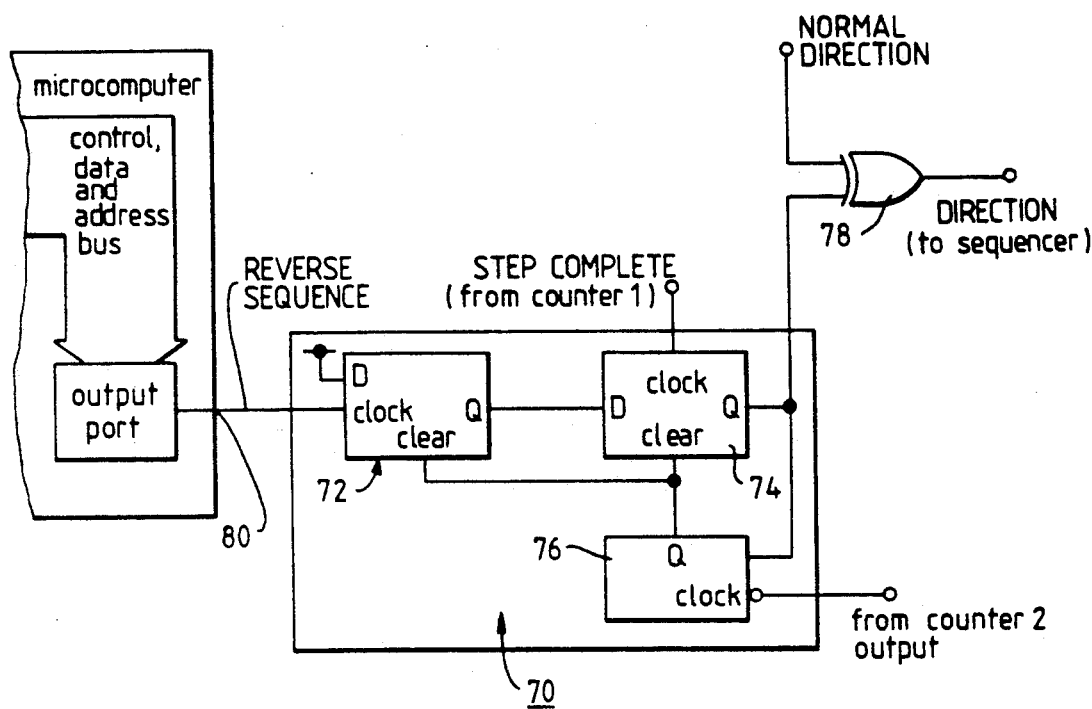
Figure 14A:
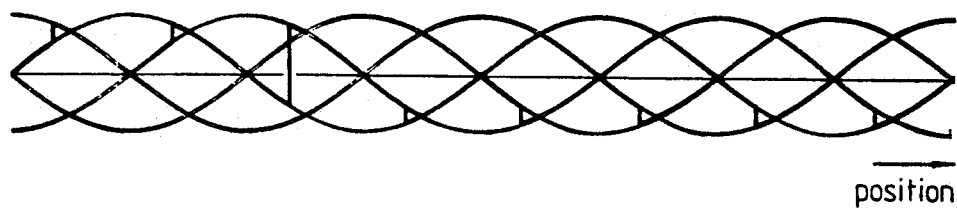
Figure 15:
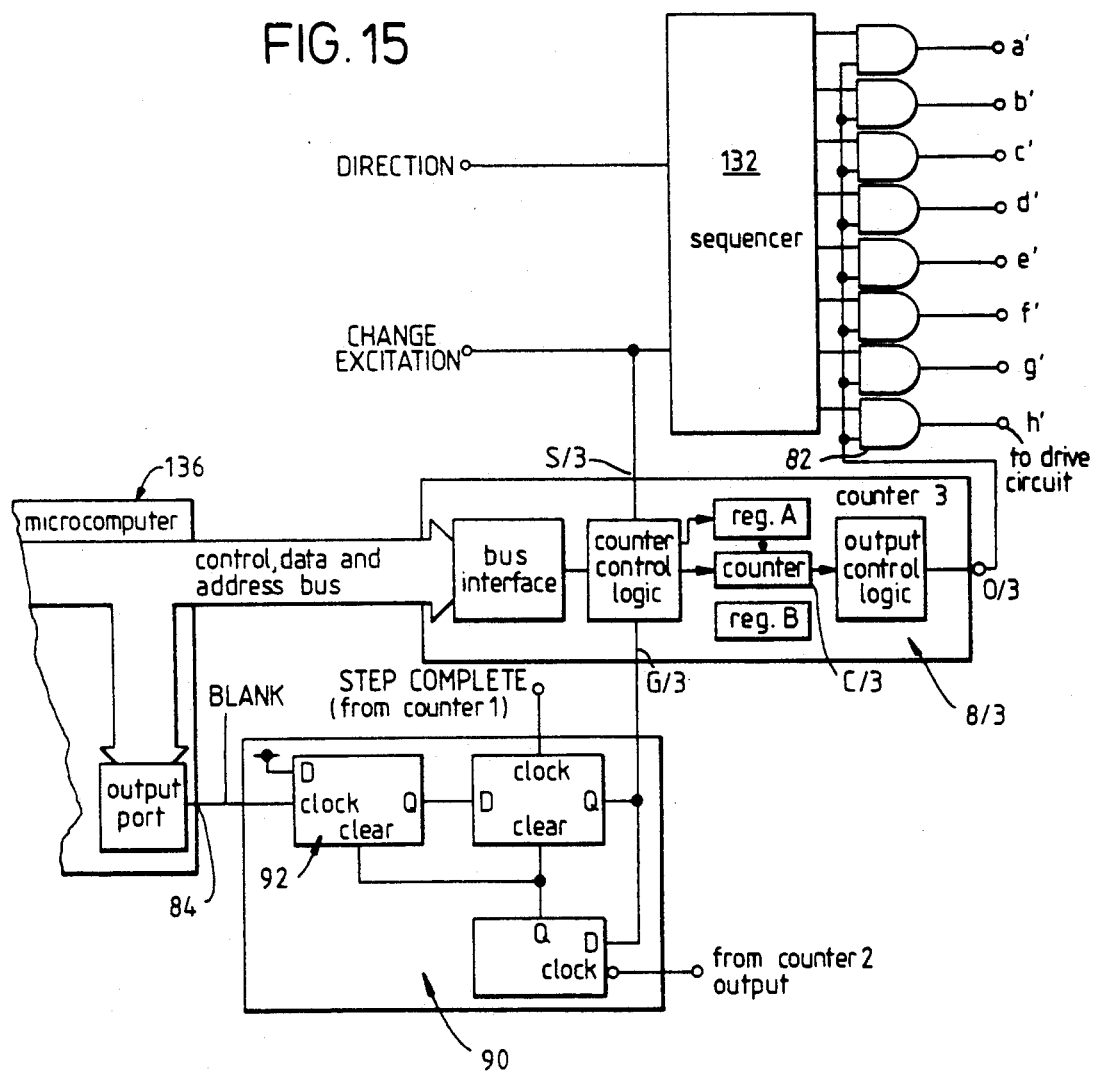

FIGS. 2A and 2B show front end views of the motor of FIG. 1 illustrating the non-excited flux pattern at the front and back ends, FIGS. 3A to 3D each show flux patterns at both ends of the motor and illustrate the flux patterns which occur when different phases of the motor are excited, FIG. 4 is an enlarged view of part of the stator and rotor of the motor of FIG. 1, FIGS. 5A to 5D show graphs of torque against position when the motor is supplied as illustrated in FIGS. 3A to 3D respectively, and FIG. 5E shows the graphs of FIGS. 5A to 5D superimposed, FIG. 6 shows the torque position graph of FIG. 5E and illustrates the switching of phase currents, FIG. 7 shows a drive circuit for a hybrid stepping motor with bifilar windings, FIG. 7A shows a switching sequence for transistors of the drive circuit of FIG. 7, FIG. 8 shows apparatus for positioning a load incorporating a closed loop circuit of the invention for a stepping motor, FIG. 9 shows a counter/timer integrated circuit configured to provide components of the apparatus of FIG. 8, FIG. 10 is a pulse diagram illustrating the generation of step complete signals by a first counter of the circuit of FIG. 9, FIG. 11 is a signal diagram illustrating the generation of change excitation signals by a second counter of the circuit of FIG. 9, FIG. 12 is a diagram of a circuit for generating change excitation signals incorporating the second counter of the circuit of FIG. 9, FIG. 13 is a signal diagram illustrating the generation of change excitation signals at a variable switching angle, FIG. 14 shows a diagram of a synchronisation circuit for rapidly switching a stepping motor from acceleration to deceleration, FIG. 14A is a graph illustrating the occurrence of change excitation pulses relative to the torque-position graph of the motor, FIG. 15 shows a diagram of a circuit for causing the motor to free wheel incorporating a third counter of the circuit of FIG. 9, and FIG. 15A is a signal diagram illustrating the operation of the circuit of FIG. 15.

Stepping motors are used in point-to-point positioning systems because their digital characteristics make them a good choice to use with digital electronic controllers, and because they have low inertia, are robust and reliable.

The invention is concerned with closed-loop control schemes for stepping motors which optimise the performance of the stepping motor. For example, to obtain optimum torque from a stepping motor over a range of speeds, its switching angle has to be varied. The control scheme enables variation of the switching angle such that the stepping motor can generate its maximum possible torque under all conditions.

FIG. 1 shows a cut-away view of a hybrid stepping motor. This stepping motor is substantially conventional and has a central shaft 102 extending coaxially of the motor and supporting a rotor generally indicated 104. As can be seen, the rotor 104 comprises a cylindrical permanent magnet 106 having two longitudinally spaced poles. In the embodiment illustrated, the end of the motor proximate to the north pole of the magnet 106 is designated the front end of the motor, whilst the end nearest the south pole is designated the back end of the motor. A respective generally cylindrical rotor cap 108, preferably of iron, is supported around each of the magnet poles.

The shaft 102 and rotor 104 are arranged within, and coaxially of, a stator 10. This stator comprises a generally hollow, cylindrical iron body 12 which is shaped to define eight longitudinally extending stator poles 14 separated by longitudinally extending winding slots 16.

Each stator pole 14 carries a winding, as winding 18 shown in FIG. 1. The windings 18 are connected to form two phases. Thus, alternate windings are connected together in series so that, as shown in FIG. 1A, those windings on odd poles 1, 3, 5 and 7 form a first phase, phase A, whilst those on even poles 2, 4, 6 and 8 form a second phase, phase B.

Figure 1A:
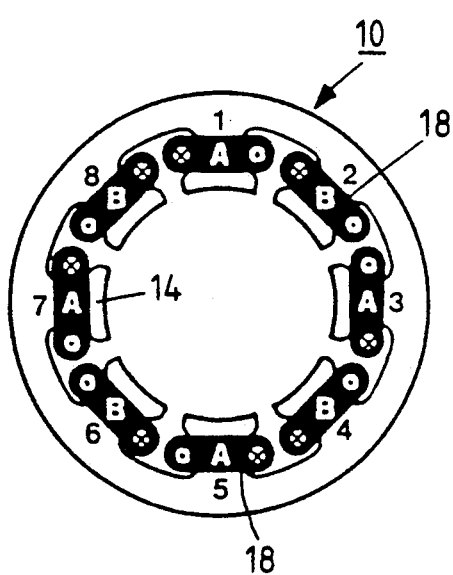
FIG. 1A shows a view of the front end of the stator of the motor of FIG. 1.

FIG. 1A shows a view of one end, the front end, of the stator 10 showing a respective winding 18 on each numbered stator pole 14, and showing the distribution of the two phases A and B. FIG. 1A also shows the direction in which current flows in each of the windings 18, when the phases are excited in one of the two possible directions. It will be seen that of the four windings making up each phase, two have currents flowing in the opposite direction to that of the other two. Thus, of the windings of phase A, the sense of the current in windings 1 and 5 is opposite to that in windings 3 and 7. Similarly, for phase B, the current in windings 2 and 6 is in the opposite sense to that in windings 4 and 8. It will be appreciated that, if no current flows in the windings 18, magnetic flux from the north pole of the rotor magnet 106 will flow radially outwardly from the north pole at the front end of the stator, across the air gap and into each stator pole. In order to return to the south pole of the rotor magnet 106, flux will flow along the length of each stator pole and then will flow across the air gap at the back end of the stator adjacent to the south pole of the rotor magnet and hence to the south pole of the rotor magnet.

FIG. 2A shows a front end view of the motor showing the non-excited flux pattern at that front end, whilst FIG. 2B similarly shows a front end view showing the flux pattern at the back end.

It is the function of the stator windings to disturb the uniform distribution of air gap flux illustrated in FIGS. 2A and 2B. If current is passed through phase A, for example, it can reinforce the flux crossing into poles 3 and 7 at the front end of the motor. However, as the windings on poles 1 and 5 are wound in the opposite sense to those on poles 3 and 7, the current through poles 1 and 5 cancels the flux. The result is illustrated in FIG. 3A which shows flux at the north end of the motor concentrated in poles 3 and 7. FIG. 3A also shows the flux distribution at the back, south pole, end of the motor where the situation is reversed because flux passes out of the stator poles here and is concentrated in poles 1 and 5.

FIG. 3A shows the situation where current is supplied to phase A in one direction, designated as the positive direction, and no current is applied to phase B. FIG. 3C shows a situation where there is still no current applied to phase B but the direction of the current supplied to phase A has been reversed to the negative direction. Here, there is a concentration of flux in poles 1 and 5 at the front, north pole, end of the motor, whereas the flux passes out of poles 3 and 7 at its back, south pole, end. Similarly, FIG. 3B and 3D show the flux concentration where there is no current supply to phase A but opposite current supplies to phase B. Positive current in phase B causes a flux concentration at poles 4 and 8 at the front end, and out of poles 2 and 6 at the back end, whereas negative current in phase B reverses the situation such that the concentration at the front end is to poles 2 and 6, and at the back end is from poles 4 and 8.

FIG. 4 is an enlarged view of part of the rotor 104 and of the stator body 10. As can be seen, each pole 14 of the stator body, and the circumference of each rotor cap 108 of the rotor 104 is provided with a series of substantially U-shaped elongate grooves 20 defining between them a series of projections or teeth 21. These teeth all have the same pitch, but the pitch is chosen so that the alignment at adjacent poles differs by one quarter of a tooth pitch. One way of arranging this is to ensure that the number of teeth defined on the rotor is one which when divided by eight provides a remainder of two. Commonly the number of teeth on the rotor is fifty.

It will be appreciated that the successive displacement by one quarter of a tooth pitch means that, for example, the front end rotor cap 108 can adopt positions in which its teeth are aligned with the stator teeth at poles 3 and 7, say, but is misaligned to some degree at all of the other stator poles. If there are fifty rotor teeth, there will be fifty such positions.

If the flux concentration at the front end of the rotor is at poles 3 and 7, that is as shown in FIG. 3A, the rotor will wish to take up a position in which the reluctance of the magnetic circuit is at its smallest. This will be when the teeth at poles 3 and 7 are aligned, and the front end rotor cap will therefore tend to move into such a position, called an equilibrium position. Of course, the rotor cap at the back of the motor must have the same set of equilibrium positions. Since the flux concentration at the back of the motor is in poles 1 and 5, the teeth on the back rotor cap are arranged to be misaligned by one half a tooth pitch as compared with those on the front end cap.

FIG. 5A shows a graph of torque against position when only phase A is excited and the current is in the positive direction shown in FIG. 3A. It will be seen that there is an almost sinusoidal variation of torque with position. The equilibrium positions E are marked. FIGS. 5B, 5C and 5D show the torque position graph for the motor when supplied as illustrated in FIGS. 3B, 3C and 3D . respectively. It will be appreciated that where there are fifty rotor teeth, there will be fifty equilibrium positions for each individual current supply being illustrated. Therefore two hundred equilibrium positions, which are equally spaced, are possible. Each set of fifty positions is obtained by passing current through a particular phase in a particular direction. The angle between adjacent equilibrium positions is the step length. FIG. 5E shows the torque position graphs of FIGS. 5A, 5B, 5C and 5D superimposed, and illustrates the step length.

From FIG. 5E it is clear how the motor can be made to rotate continuously. If the motor is at a particular equilibrium position it can be made to move by simply switching off the phase which is excited and switching on another phase. The switching action moves the set of equilibrium positions and so encourages the rotor to move accordingly. Switching the current in the sequence $A+ \rightarrow B+ \rightarrow A- \rightarrow B- \rightarrow$ causes clockwise rotation, whilst reversing the sequence provides anticlockwise rotation.

FIG. 6 shows the torque position graph of FIG. 5E, but shows the positions at which the phase currents are switched so that at low speeds of rotation the motor can be made to generate its maximum torque. As is apparent from FIG. 6, each phase is switched on about one and a half steps before the equilibrium for that phase is reached, and is switched off about half a step before the equilibrium position. The switching angle is said to be zero in this case.

Closed loop control allows the maximum torque situation illustrated in FIG. 6 to be attained. For example, a position sensor can be made to give a pulse each time one of the switching positions is reached, and this pulse can be used to trigger a change in the winding excitation.

At low speeds the winding current and voltage waveforms are almost rectangular, the rise and fall times of these waveforms being insignificant compared to the time for which each phase is excited. The static torque curves thus give a good indication of the torque generated during rotation. But at high speeds the current waveform is far from rectangular. The back emf generated in the windings and variations in the winding inductance, both cause distortion of the current waveforms. So a zero switching angle is only best at low speeds. As the motor speed increases, the switching angle has to be increased so that the excitation changes happen earlier than at low speeds. Switching angle control is therefore one way of gaining good performance from a closed loop stepping motor system.

As we have seen, when a winding in the motor is not excited, it is not contributing to the production of torque. The $A+ \rightarrow B+ \rightarrow A- \rightarrow B- \rightarrow$ sequence has one phase unexcited at all times. However, hybrid motors will also work when the following sequence is used $A+B+ \rightarrow A-B+ \rightarrow A-B- \rightarrow A+B- \rightarrow$. In this sequence, the current in each phase is reversed alternately, so that both phases always carry current.

Commonly, hybrid stepping motors have bifilar windings, that is, each stator pole carries two windings, and the motor therefore has two phase A windings and two phase B windings. However, using the scheme set out above, in which both phases are excited at once, still leaves half the windings unexcited at any given time.

FIG. 7 shows a drive circuit for a hybrid stepping motor with bifilar pairs of windings, where each pair of windings is connected in series and thereby used as a single winding. In this drive circuit, current can be caused to flow in the direction A+through the phase A windings by switching ON transistors A1 and A2. Current flow in the A− direction requires transistors B1 and B2 to be switched ON. Similarly, current flow in the positive direction through phase B can be achieved by switching on transistors C1 and C2, whilst B− current flow is by way of transistors D1 and D2. It will be appreciated that each transistor can be switched ON and off simply by the application of an appropriate pulse to its base. The switching sequence for the transistors of FIG. 7 is indicated in FIG. 7A. The transistor switching sequence there illustrated gives the excitation sequence $A+B+ \rightarrow A-B+ \rightarrow A-B- \rightarrow A+B- \rightarrow$.

The drive circuit shown in FIG. 7 includes resistors RA and RB which act as "forcing resistors". As will be appreciated, changes in the winding current in the circuit are opposed by the inductive effect of the windings. Including a resistor RA, RB in the circuit for each phase reduces the inductive time constant and so allows the current to establish itself much more quickly when a phase is switched on. Of course, using resistors, as RA and RB, means that the supply voltage has to be increased so that the steady state current remains the same.

We have seen how a stepping motor operates, and FIG. 7 shows a drive circuit for providing current to the windings. However, it is important to ensure that changes in the excitation of the motor windings happen at the correct instances. Exact timing of these instances is critical since any error will alter the switching angle at which the motor operates. This is preferably done by means of a closed loop controller supplied with detailed information about the rotor position. This position information, for example, can be obtained from some kind of position sensor attached to the motor shaft and may take the form of a train of pulses, with each pulse indicating that the shaft has rotated through a small fraction of a step. The controller has to be able to detect the occurrence of those pulses which correspond to excitation change positions, and then to quickly generate the signals which trigger excitation changes. However, in addition to triggering commutations quickly when a rotor reaches certain positions, the controller must also alter those positions as the speed changes.

FIG. 8 shows one implementation of an apparatus for positioning a load which uses a stepping motor as its actuator and incorporates a minor loop circuit of the invention for controlling the stepping motor. The positioning apparatus illustrated is described and claimed in our copending application filed on even date with the present application (PCT/GB91/0024 filed Feb. 22, 1991 claiming priority from UK application 9004006.4 filed Feb. 22, 1990 and corresponding to co-pending U.S. application Ser. No. 07/920,502 filed Aug. 12, 1992 naming Messrs. Danbury and Acarnley as inventors, and is included for completeness.

The apparatus shown in FIG. 8 comprises a positioning system including a stepping motor 120 for moving a load (not shown). In the embodiment illustrated in FIG. 8, the motor 120 is coupled to move the load by any suitable means. In this respect, mechanical resonances can have a detrimental effect on the reliability of the method and therefore the mechanical coupling of the motor to its load should be as stiff as possible.

The stepping motor 120 is driven by a drive circuit 122, for example, the transistorised drive circuit shown in FIG. 7. Of course, any other suitable drive circuit may be utilised.

A minor loop control circuit for the stepping motor 120 is indicated generally at 124 and is arranged to provide immediate control of the motor 120. A major loop circuit indicated at 126 is provided for controlling the minor loop. This approach enables efficient control of the stepping motor 120 so that it can perform to the full extent of its potential.

As we have seen, in order to control a stepping motor so that it gives maximum torque, it is necessary to switch the winding currents of the motor at particular positions of its rotor, that is at a predetermined switching angle. At low speeds the windings should be switched at a zero switching angle, but as the motor speed increases the switching angle has to be increased. Thus, the drive circuit 122 should be provided with excitation-change pulses which occur at certain angular positions of the motor and which are determined by the switching angle/speed function for the motor. Therefore, two switching angle/speed functions are provided for the motor, one to be used for accelerating torque and the other for decelerating torque. In the circuit of FIG. 8, it is the minor loop circuit 124 which provides the excitation pulses when the rotor reaches certain positions and thereby provides for driving of the stepping motor 120 with its maximum possible torque at all times. It is the major loop circuit 126 which determines which of the two switching angle/speed functions the minor loop 124 is to use. The major loop circuit 126 also varies the switching angle itself as speed varies.

It will be seen that the minor loop circuit 124 includes a position and speed sensor 128. This sensor may be, for example, a commercially available position sensor attached to the motor shaft and arranged to generate a train of pulses, each pulse indicating that the shaft has rotated through a small fraction of a step. Thus, counting the number of pulses generated will give an indication of the angular rotation of the motor and hence of the distance which has been moved by the load. Any suitable sensor can be used. High resolution optical encoders which provide several thousand pulses per revolution, for example, are particularly simple to use, but any other method of gaining information about the position of the motor could be employed.

As we have seen, the minor loop circuit 124 requires information about the position and speed of the motor 120 so that the motor 120 can be driven in accordance therewith. Accordingly, the pulses or other signals received from the position and speed sensor 128 are fed back to a minor loop controller indicated at 130 arranged to control the operation of the drive circuit 122.

The minor loop controller 130 comprises a sequencer 132 arranged to determine the state of the transistors in the drive circuit 122. In this respect, the sequencer 132 has eight output terminals, each of which is connected to the gate of a respective one of the transistors A1 to D2 of the drive circuit 122. Output signals are arranged to appear on the output terminals of the sequencer 132 in accordance with the switching sequence for the transistors illustrated in FIG. 7A. The sequencer 132 has two inputs, the first being a change excitation input. Each falling edge which appears on the change excitation input causes the eight control signals on the output terminals of the sequencer 132 to change so that they correspond to the next step in the four step drive sequence of FIG. 7A. The direction in which the sequencer 132 goes through the sequence is determined by the level of the signal on the second direction, input to the sequencer when a falling edge appears on the change excitation input.

The minor loop controller 130 also includes an excitation controller 134 which is described further below, and which is arranged in response to pulses from the sensor 128 to produce change excitation pulses on its change excitation output at appropriate times.

As we shall see, the minor loop controller 130 is arranged to generate excitation pulses which depend upon the switching angle of the motor 120. However, and as discussed above, it is also necessary to alter the switching angle required in dependence upon the speed of the motor 120. Thus, there is a need to measure the speed of the motor 120, to check if the switching angle is at an optimum value for the speed, and if not to alter that switching angle to one which is more appropriate. These functions are arranged to be performed, not by the minor loop circuit 124, but by the major loop circuit 126.

The manner in which the major loop circuit 126 performs its tasks, and indeed the tasks which it has to perform, are generally outside the scope of this application and will not be further described herein. However, the major loop circuit 126 is arranged to include an interrupt routine, which is schematically illustrated as a processing area 142, and which controls the flow of data from handling means 140 of the major loop circuit 126 to a major loop program 138 of a microprocessor 136. This interrupt routine 142 is also arranged to control the data path from the major loop program 138 to the minor loop controller 130.

Communication between the interrupt routine 142 and the major loop program 138 is arranged to make as few demands as possible on the major loop program 138. For this reason, the interrupt routine 142 and the major loop program 138 are not synchronised. In addition, the interrupt routine 142 is arranged to control a memory area 144 configured to include data queues arranged to pass data between the major loop program 138 and the interrupt routine 142. It is arranged that data is passed when ever the interrupt routine executes.

In FIG. 8 there is also indicated a supervisor 146 which communicates with the major-loop program 38. It is the supervisor 146 which decides when positioning operations by the stepping motor 120 are required, and what the length and direction of these operations should be.

The data handling means 140 has to obtain information about the position and speed of the motor 120, and the interrupt routine 142 is executed periodically, for example once every step of the motor 120. It would be possible to use a speed sensor, for example a tachometer to measure the speed of of the motor 120 directly. It would also be possible to provide clock means for the interrupt routine 142. However, in the illustrated embodiment, the sensor 128 already provided in the minor loop circuit 124 is arranged to provide the necessary speed information and is also arranged to generate signals to clock the interrupt routine 142. Preferably, the sensor 128 is a high resolution encoder. Furthermore, the data handling means 140 and the excitation controller 134 can be particularly usefully configured using a commercially available counter/timer integrated circuit, the AM9513 (Advance Micro Devices 1984) which is illustrated in FIG. 9.

As is shown in FIG. 9, the counter/timer integrated circuit consists of five 16-bit counter circuits 8/1, 8/2, 8/3, 8/4, 8/5. Each counter circuit has a respective source input terminal S/1, S/2, S/3, S/4, S/5 and a respective output terminal 0/1, 0/2, 0/3, 0/4, and 0/5. In addition, each individual counter circuit has a respective gate input G/1, G/2, G/3, G/4, G/5. Each counter circuit is arranged to communicate with an address, data and control bus 148, which is in communication with the microprocessor 136, by way of an appropriate interface I/1, I/2, I/3, I/4, I/5.

It will be seen from FIG. 9 that each counter circuit 8/1, 8/2, 8/3, 8/4 and 8/5 comprises a respective counter, as C/1, which is connected by way of a respective control logic, as CL/1 to the respective input S/1 and, by the appropriate interface I/1, to the bus 148. In the particular configuration illustrated, each counter C/1, C/2, C/3, C/4 and C/5, is a 16-bit counter and is associated with two 16-bit registers A and B. Each counter, as C/1, is also connected by way of a respective output control logic circuit, as OL/1, to the respective output terminal, as 0/1. In the embodiment illustrated, the first counter circuit 8/1 is arranged to form an interrupt request generator 150 of the data handling means 140. The counter circuits 8/2 and 8/3 configure the excitation controller 134 of the minor loop controller 130, and the counter circuit 8/4 configures a timer for data acquisition means 152 of the data handling means 140. In this particular embodiment the fifth counter circuit 8/5 on the chip is not utilised.

Let us look now at the operation of the interrupt request generator 150 which is configured by way of the counter circuit 8/1. The request generator 150 is arranged to produce a step complete signal SC to clock the interrupt routine 142 each time the motor 120 moves by one step. Let us assume that the motor 120 and the encoder 128 are configured so that the encoder 128 provides 10 equally spaced pulses for each motor step. Thus, on initialisation, the counter C/1 of the counter circuit 8/1 is loaded with the number 1, whilst the register A to which it is connected is loaded with the number 10. In use, pulses from the encoder 128 are applied to the input S/1 of the circuit 8/1. The control logic CL/1 is arranged such that the counter C/1 decrements on each rising edge of the encoder signal ES as can be seen in FIG. 10. When the count of counter C/1 reaches zero, the counter immediately reloads itself from the register A and at the same time provides a step complete signal SC which is applied to the output 0/1 byway of the output control logic OL/1. The rising edge of the step complete signal SC is arranged to trigger the interrupt routine 142 as is also indicated in FIG. 10.

The counter circuit 8/4 is configured to determine the speed of the motor 120 and forms part of the data acquisition means 152. The preferred method of determining speed is to determine the encoder pulse periods. For example, if a counter is arranged to count pulses from a fixed frequency source, and the count is set to zero at the beginning of each encoder pulse, the count which is accumulated before the beginning of the next encoder pulse will indicate the encoder pulse period. The reciprocal of this pulse period will be proportional to the average speed during this period.

The counter circuit 8/4 has been configured to determine the speed of the motor 120 by measuring the duration of each step. In this respect, the source input of the circuit 8/4 is left unconnected because the counter C/4 is arranged to count pulses from an internal frequency source FS. Preferably, the frequency source provides pulses at a reference frequency of 1MHz. During initialisation, the register A connected to counter C/4 is loaded with zero. The counter circuit 8/4 is arranged to receive on its gate input G/4 the step complete pulses SC from the counter circuit 8/1. Each time a step complete pulse arrives at the gate input G/4, the contents of the counter C/4 are transferred into the register B, and the counter C/4 resets itself to zero by loading from the register A. Register B retains the count, which represents the duration of the most recent step, until it is read by the interrupt routine. The operation of the counter C/4 and of the interrupt routine 142 remain synchronised because the step complete signal SC controls both the execution of the interrupt routine and the operation of the counter C/4.

The counter circuits 8/2 and 8/3 shown in FIG. 9 are configured to provide part of the excitation controller 134. It is output terminal 0/2 of the counter circuit 8/2 which generally provides the change excitation signal, and FIG. 12 shows the connection of the counter circuit 8/2 to the microprocessor 136, and also shows the synchronisation circuit 50 which is required. The counter circuit 8/2 is arranged to generally produce an output pulse on its output 0/2 each time the stepping motor 120 moves one step, that is after every tenth encoder pulse is received. However, as we shall see, the number of encoder pulses between the two sequential output pulses can be altered whilst the counter is operating if required.

As can be seen from FIG. 12, the encoder pulses ES are fed by way of the source input S/2 to the counter C/2 by way of the counter control logic CL/2. The counter C/2 is arranged to be loaded from either of registers A or B and is arranged to decrement on each falling edge of the encoder signal ES. When the count reaches zero an output pulse is generated and fed to one input of an OR gate 52. The output of the OR gate is the change excitation signal for the sequencer 132. The gate input G/2 of the counter 8/2 is connected to the synchronisation circuit 50 which, as we shall see, is arranged to cause a change in the timing of the output pulses, and to synchronise those pulses with the motor operation.

During initialisation, the microprocessor 136 writes the number 10 into the register A and loads a smaller number, for example 5, in the counter C/2 itself. The preset number in the counter C/2 determines the switching angle at which running of the motor will commence. The motor is started by way of a start signal which is generated by the microprocessor 136 and appears on an output port 54 thereof. It will be appreciated from FIG. 12 that the start signal, which is a high level pulse, is fed by the OR gate 52 to the sequencer 132 to cause a first excitation change and thereby to start the motor. FIG. 11 is a pulse diagram illustrating the generation of change excitation pulses and in that diagram the first change excitation pulse after initialisation is that generated by the microprocessor start pulse.

Once the motor has started encoder pulses ES, as shown in FIG. 11 are generated, and as we saw previously, step complete signals SC are generated after every tenth encoder pulse. The counter C/2 decrements and produces an output signal 0/2 whenever the count reaches zero, at the same time as the counter is reloaded from register A. It will be appreciated that once the motor has started, the counter 8/2 produces a sequence of output signals 0/2 which are passed by way of the OR gate 52 to the sequencer 132 as change excitation pulses. It will also be appreciated that it is the number which is loaded into the counter C/2 on initialisation, which determines when the change excitation signals are generated. In this embodiment, the first signal occurs after the motor has rotated through half a step, and this sets the switching angle close to the theoretical optimum for low speed running.

FIG. 13 illustrates how the circuit of FIG. 12 can be used to advance the switching angle when the speed increases. If the switching angle is to be advanced, the microprocessor 136 is arranged to write a number smaller than 10 into the register B, for example,this might be the number B. Loading the register B does not affect the operation of the counter circuit 8/2. The counter C/2 is arranged to load either from register A or from register B depending on the level at the gate input G/2. Normally this level is low, and the register A is used.

If the switching angle is to be advanced, the microprocessor 136 also puts an output pulse on a change switching angle output port 56. This causes a high level command pulse to be applied to the gate G/2 so that the next time the counter C/2 reloads it reloads from register B. As this register loads the counter C/2 with eight only, it will be appreciated that the counter will then decrement to zero, and produce the output pulse in a shorter time. Once the output pulse 0/2 has been generated, the gate G/2 is again brought low so that the standard ten pulse sequence is resumed. As is clearly shown in FIG. 13, the motor takes a single "short step" because the duration between two successive change excitation pulses is shortened, and thereafter successive output pulses will occur at an increased switching angle.

The synchronisation circuit 50 is provided to synchronise the change switching angle command with the step complete SC signal. Because of the synchronisation circuit 50, the change switching angle command could have been issued at any time during the shaded period in FIG. 13, and the timing of the "short step" would have been exactly the same. This is important because it is the interrupt routine which is arranged to issue the change switching angle command, and this routine is triggered by the rising edge of the step complete signal, which is at the start of the shaded period. The position at which the command to change the switching angle within that period is actually issued depends upon the speed of the motor and upon the software response time. At low speeds the response would be short compared to the step duration and the change switching angle command would be issued before the next change excitation pulse, that is the pulse A in FIG. 13. At high speeds the response time might be comparable with the step duration so that the command would occur after the change excitation pulse A. At intermediate speeds, the random variation in software response time would mean that the change switching angle command would sometimes come before pulse A and sometimes after. Without proper synchronisation, these effects would result in unpredictable variations in the timing of the short step. Whilst in a simple system this may not matter, in a time optimal control scheme of the type which the apparatus of FIG. 8 is to run, it is essential for the software to know exactly when the minor loop commands take effect on the motor.

As can been seen from FIG. 12, the synchronisation circuit 50 includes three D-type flip-flops 60, 62 and 64. It will be seen that the high level change switching angle command pulse at output port 56 is applied to the clock input of the flip-flop 60. The 0 output of the flip-flop 60 is connected to the data input D of the second flip-flop 62. Thus, the appearance of the change switching angle pulse at its clock input produces a high level command signal at the output of the flip-flop 60 as can be seen from FIG. 13.

The clock input of the flip-flop 62 is connected to receive the step complete signal SC from the counter circuit 8/1. Therefore, the arrival of the step complete signal SC at the clock input of the flip-flop 62 puts the high level pulse at its data input D on its Q output. Thus, as the step complete signal is received a high level signal, derived from the change switching angle pulse is applied to the gate input of the counter circuit 8/2. It will therefore be seen that the high level gate signal is synchronised with the step complete signal. The output Q of the flip-flop 62 is also connected to a D input of the third flip-flop 64. The Q output of the flip-flip 64 is connected to a clear input of both flip-flops 60 and 62. The clock input of the flip-flop 64 is connected to the output 0/2 of the counter circuit 8/2.

The appearance of the change switching angle pulse at output 56 of the microcomputer 136 latches a high level pulse at the D input of the flip-flop 62. As soon as a step complete pulse is received by this flip-flop 62, the high level signal is placed on the output of the flip-flop 62 and hence on the gate of the counter circuit 8/2. At this time, the counter C/2 is still decrementing on each arrival of an encoder signal pulse. When the counter C/2 reaches zero it outputs the pulse B which is shown in FIG. 13 and reloads. However, the existence of the high level signal on the gate G/2 causes the counter to reload from the register B rather than from register A. The output pulse B clocks the flip-flop 64 whereby the high level at its input provides a reset signal at its output which clears the flip-flops 60 and 62 and thereby clears the high level signal at the gate G/2. Thus the next time the counter C/2 reloads there will be a low level signal at the gate G/2 and it will reload from register A. The time at which the change excitation pulses are applied to the motor relative to its torque-position graph is illustrated in FIG. 13.

The circuit of FIG. 12 can be used to set the switching angle to any desired value. It is only necessary to adjust the number to be loaded in register B accordingly. It can also be used to provide a "long-step" to retard the switching angle. If the long-step was equal in length to more than 2 steps, such an adjustment would switch the switching angle from positive to negative, and therefore to provide deceleration of the motor.

The use of the circuit of FIG. 12 to produce deceleration has the disadvantage that there is the lapse of several steps when no excitation pulses are being provided. FIG. 14 therefore shows a preferred synchronisation circuit 70 which can be used to rapidly switch the motor from acceleration to deceleration.

The synchronisation circuit 70 is similar to the synchronisation circuit 50 of FIG. 12 and comprises three interconnected flip-flops 72, 74 and 76. The flip-flops 72 and 74 are substantially the same, and are connected in a similar manner, to the flip-flops 60 and 62 of FIG. 12 and are arranged to put a high level signal on one input of an exclusive OR gate 78 whose output provides the direction signals for the sequencer 132. The flip-flop 76 is similar to the flip-flop 64 and also receives its clock input from the output 0/2 of the counter circuit 8/2. The clock input of the flip-flop 72 is connected to an output port 80 of the microprocessor 136 at which a high level signal, called the reverse sequence signal, is output when the microprocessor requires the direction of the transistor switching sequence shown in FIG. 7A to be reversed. In the same manner as described above with reference to FIG. 12, this reverse sequence signal is applied as a high level signal to the exclusive OR gate 78 in synchronism with the receipt of a step complete signal SC from the counter circuit 8/1. Thereafter, and as described above, the signal is cleared, and the flip-flops 72 and 74 are reset by the receipt of an output signal from the counter circuit 8/2.

The second input to the exclusive OR gate 78 is the normal direction signal provided by the microprocessor, and this may be high or low depending upon whether the motor is required to rotate clockwise or anticlockwise. If the normal direction signal is low, for example, the output of the exclusive OR gate 78 will be low level. Of course, the appearance of a high level signal from the flip-flop 74 will invert the normal direction of the gate output and therefore cause the sequencer 132 to move one step backwardly through the transistor switching sequence. This causes rapid reversal of the torque as is illustrated in FIG. 14A.

The apparatus illustrated in FIG. 8 obtains information for the microprocessor 136 by causing the motor 120 to undertake a trial deceleration. This can be done by turning all of the transistors of the drive circuit of FIG. 7 off so that the motor "free-wheels", and the counter circuit 8/3 of the circuit of FIG. 9 together with associated synchronisation circuitry is arranged to do this. FIG. 15 shows a diagram of a circuit for causing the motor to free-wheel and it will be seen that the output 0/3 of the counter circuit 8/3 is connected to a first input of an array of eight AND gates 82. The outputs of the AND gates 82 are each connected to the gate of a respective transistor A1 to D2 of the drive circuit 122. The source input terminal S/3 of the counter circuit 8/3 is connected to the change excitation input of the sequencer 132. The gate input terminal G/3 is connected to a synchronisation circuit 90 which is similar in construction and operation to the synchronisation circuits 50 and 70 described above. The clock input of a first flip-flop 92 of the synchronisation circuit 90 is connected to an output port 84 of the microprocessor 136. When free-wheeling of the motor 120 is required a high level blanking signal is applied to the output port 84.

In operation, the counter circuit 8/3 normally remains disabled with a high level signal on its output 0/3 so that the AND gates 82 simply pass the transistor control signals from the sequencer 132 to the drive circuit 122. When free-wheeling or blanking is required, the microprocessor 136 is arranged to write the number 1 into the counter C/3 and it also writes the number of steps which are to be blanked into the register A. The microprocessor 136 also puts a high level signal onto the output port 84. As described above with reference to the synchronisation circuits 50 and 70, the appearance of the high level signal at output port 84 puts a high level command signal on the gate G/3 of the counter circuit 8/3, and the appearance of this high level signal is arranged to cause the counter C/3 to decrement. In this respect, the counter C/3 decrements on the falling edge of a change excitation signal. The first change excitation signal received after the enablement of the counter C/3 therefore decrements its count to zero. The mode of counter circuit 8/3 is such that the out signal on output 0/3 toggles, rather than giving a pulse, whenever the count of counter C/3 reaches zero. The counter simultaneously reloads from register A and the out signal 0/3 goes low and stays low until the counter C/3 again counts down to zero. It will be appreciated that when the output signal 0/3 is low, passage of the transistor control signals by way of the AND gates 82 is inhibited. As previously, the appearance of the high level signal on the gate G/3 of the counter circuit 8/3 is removed as soon as the synchronisation circuit 90 receives an output signal from the counter circuit 8/2. Thus, when the counter C/3 has counted down to zero, the low signal now appearing on the gate G/3 causes the control logic of the circuit 8/3 to automatically disable the counter C/3 inhibiting further blanking. The signal on the output terminal 0/3 is thereby returned to its high level such that the out signal has completed a high-low-high cycle. FIG. 15A shows that when the output signal of the counter circuit 8/3 is low, and the AND gates 82 thereby prevent the transistor control signals from reaching the drive circuit, the motor is left unexcited for a number of steps which are equal in number to the initial contents of the register A.

It will be appreciated that other variations and modifications to the apparatus as described above may be made within the scope of this invention.

What is claimed is:

1. A closed loop control circuit for a stepping motor comprising:
    drive means having a plurality of switching positions in each of which the drive means is arranged to supply current to selected windings of a stepping motor in selected directions, means arranged to change the switching positions in sequence, sensor means arranged to generate a train of pulses representative of the speed and position of the motor, and control means arranged to receive said train of pulses and to generate in response thereto change excitation signals for application to said drive means to change the switching positions, the control means being arranged to produce direction signals for application to said drive means to determine the direction in which the sequence of switching positions is changed, and said control means being arranged to generate a change excitation signal each time a selected number of said pulses is received, and wherein said selected number is variable whereby the time between successive change excitation signals is variable.

2. A control circuit for a stepping motor comprising:

drive means having a plurality of switching positions in each of which the drive means is arranged to supply current to selected windings of a stepping motor in selected directions, means arranged to change the switching positions in sequence, sensor means for providing information relating to the speed and position of the motor, and control means arranged to receive the speed and position information and to generate in response thereto control signals for said drive means, wherein said control means includes inhibiting means arranged selectively to inhibit the application of control signals to said drive means.

3. A control circuit for a stepping motor comprising:

drive means having a plurality of switching positions in each of which the drive means is arranged to supply current to selected windings of a stepping motor in selected directions, means arranged to change the switching positions in sequence, sensor means for providing information relating to the speed and position of the motor, and control means arranged to receive the speed and position information and to generate in response thereto control signals for said drive means, wherein said control means includes step complete signal generating means arranged to generate a step complete signal upon receipt of information from said sensor means indicating the motor has moved a predetermined number of steps, and synchronizing means receiving said step complete signals and arranged to enable generation of said control signals upon receipt of a step complete signal.

4. A control circuit as in claim 2 or 3 wherein the control signals generated by said control means comprise change excitation signals for application to said drive means to change the switching positions, and direction signals for application to said drive means to determine the direction in which the sequence of switching positions is changed.

5. A control circuit as in claim 1, 2 or 3 wherein:

said sensor means is arranged to be coupled to the motor and is arranged to generate a train of pulses representative of the speed and position of the motor, and said control means comprises first means arranged to receive said train of pulses from said sensor means and to generate a step complete signal each time a predetermined number of said pulses are received.

6. A control circuit as in claim 5 wherein:

said control means comprises second means arranged to receive said train of pulses from said sensor means and to generate a change excitation signal each time a selected number of said pulses is received, wherein said selected number is variable, said second means including a second counter circuit having a counter coupled to first and second registers, and to a control logic circuit, each of the first and second registers being arranged to be loaded with a preselected number, and said control logic circuit being arranged to selectively transfer the contents of one of said first and second registers to the counter when its count is zero, and said counter being arranged to be decremented upon the arrival of each pulse from said sensor means.

7. A control circuit as in claim 6 wherein the control logic circuit of said second counter circuit is arranged to cause the counter to reload from the first register, but is arranged to cause the counter to reload from the second register upon receipt of a command signal from a synchronization circuit arranged to receive step complete signals.

8. A control circuit as in claim 6 further comprising:

logic means for applying the change excitation signals generated by said second means to said drive means, and wherein said logic means has a first input to which change excitation signals are fed, and a second input arranged to receive start signals.

9. A control circuit as in claim 5 wherein:

said control means comprises third means arranged to inhibit the application of control signals to said drive means upon the receipt of command signals, the control signals generated by said control means comprising change excitation signals for application to said drive means to change the switching positions, and direction signals for application to said drive means to determine the direction in which the sequence of switching positions is changed, said third means being arranged to inhibit the application of at least said change excitation signals to said drive means.

10. A control circuit as in claim 9 wherein said control means further comprises:

step complete signal generating means arranged to generate a step complete signal upon receipt of information from said sensor means indicating the motor has moved a predetermined number of steps, and synchronizing means receiving said step complete signals and arranged to enable generation of said control signals upon receipt of a step complete signal, said synchronizing means being arranged to generate said command signals, whereby said command signals are synchronized with said step complete signals.

11. A control circuit as in claim 10 further comprising logic means arranged to pass the change excitation signals to said drive means, and wherein said third means is arranged to inhibit passage of the change excitation signals through said logic means upon receipt of a command signal, said logic means including an array of logic gates, and wherein said third means comprises a third counter circuit having an output connected to one input of each of the gates in said array.

12. A control circuit as in claim 1, 2 or 3 wherein said control means further comprises:
   step complete signal generating means arranged to generate a step complete signal upon receipt of information from said sensor means indicating the motor has moved a predetermined number of steps, and
   synchronizing means receiving said step complete signals,
   wherein said synchronizing means comprises at least one synchronization circuit having a plurality of bistable circuits, a clock input of one of said bistable circuits being arranged to receive step complete signals.

13. A control circuit as in claim 12 wherein said synchronization circuit comprises a first flip-flop having an output terminal connected to an input of a second flip-flop, an output of the second flip-flop being arranged to provide a command signal, and are set flip-flop arranged to receive at its input the command signal generated at the output of said second flip-flop.

14. A control circuit as in claim 1, 2 or 3 wherein said drive means comprises a drive circuit arranged to apply current to selected windings of a stepping motor in selected directions, and sequencing means arranged to control the drive circuit to select the windings to which current is to be supplied and the current direction, and wherein the drive circuit comprises a plurality of switching devices and the sequencing means is arranged to switch the switching devices on and off in sequence.

15. A closed loop torque-enhancing control circuit for a stepping motor having plural electrical windings and a rotatable shaft, said control circuit comprising:
   a rotational sensor coupled to the stepping motor and providing electrical pulse signals representing the rotational speed and position of the motor shaft;
   an electrical sequential switching circuit coupled to said sensor and successively providing electrical drive power to windings of the stepping motor at switch angles which are in advance of reaching a corresponding motor shaft equilibrium position and in response to successively counted numbers of said pulse signals; and
   a torque-enhancing switch angle control circuit coupled to said sensor and to said switching circuit which changes the magnitude of said advanced switching angle in proportion to the shaft speed of the motor thereby increasing the torque provided by the motor shaft.

* * * * *